Sept. 18, 1934.  C. W. OLSON  1,974,249
MOTOR OPERATED CHUCK
Filed May 23, 1933   2 Sheets-Sheet 1

Inventor
Charles W. Olson,
By Bates, Golrick & Fearn
Attorneys

Sept. 18, 1934.   C. W. OLSON   1,974,249
MOTOR OPERATED CHUCK
Filed May 23, 1933   2 Sheets-Sheet 2
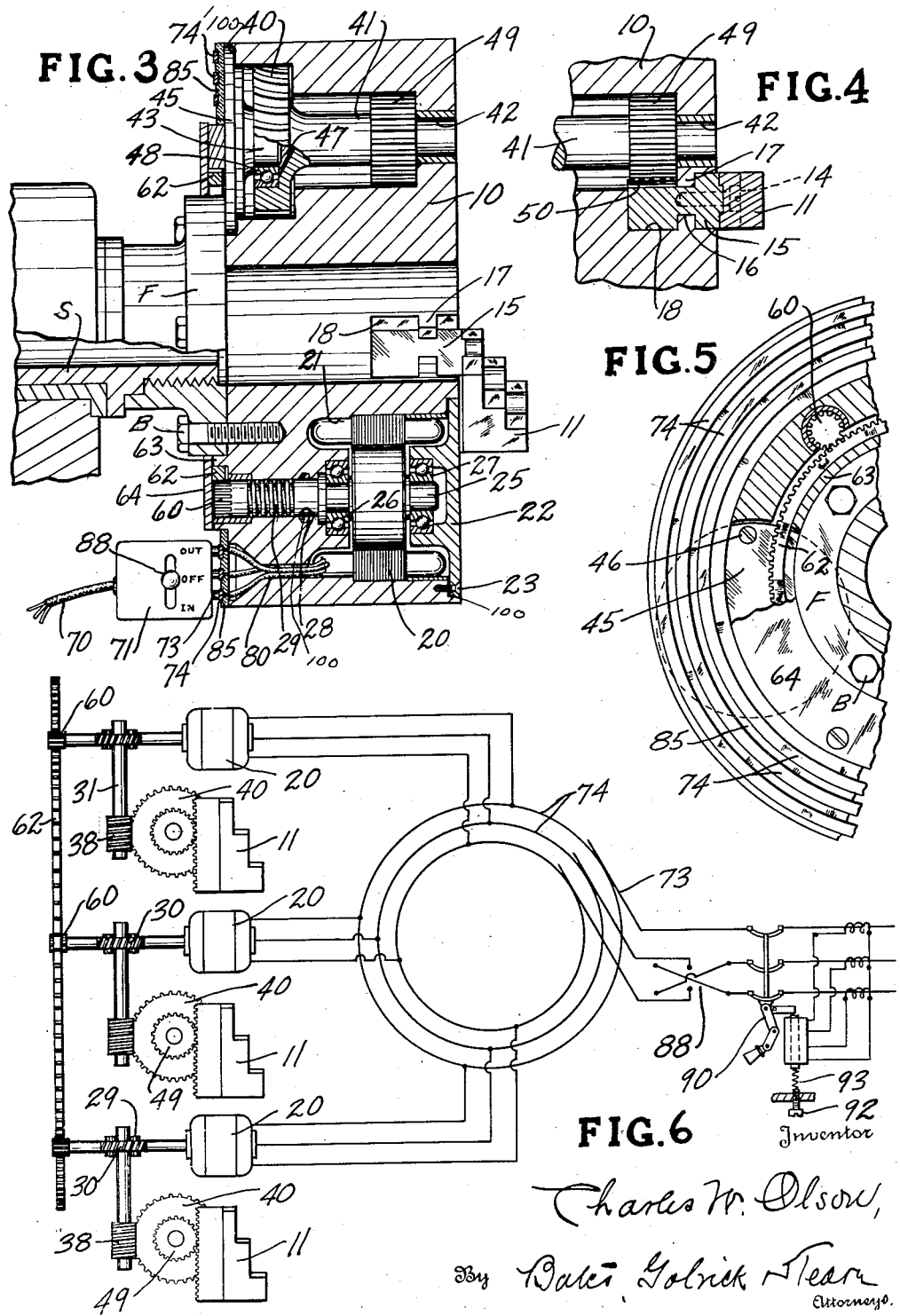

Patented Sept. 18, 1934

1,974,249

UNITED STATES PATENT OFFICE 1,974,249

MOTOR-OPERATED CHUCK

Charles W. Olson, Cleveland Heights, Ohio

Application May 23, 1933, Serial No. 672,400

12 Claims. (Cl. 279—1)

This invention relates to a chucking device for a machine tool, and especially to a motor operated chuck or workholder for use in connection with an engine lathe or similar type of cutting machine, wherein a chuck is used to grip and rotate either the work or the tool. The present invention is particularly concerned with an improved form of power-operated mechanism for moving the jaws or work-gripping members of a chuck.

The general object of the invention is to provide an improved power-operated mechanism for moving the jaws of a chuck to cause the work to be gripped by the jaws with sufficient force to clamp the work rigidly in the chuck and concentric with the axis of the chuck and of the lathe spindle on which the chuck is mounted, the clamping action being retained indefinitely after the power is shut off.

Another object of the invention is to provide a motor operated mechanism for moving the jaws of a rotatable chuck, which mechanism may be incorporated in the chuck itself and which will cause the chuck to securely grip the work without danger of damage thereto and with great precision, and which is readily operable by the mechanic.

A more specific object of the invention is to provide an electrically operated mechanism for the jaws of an engine lathe chuck or workholder, which mechanism may readily be incorporated in and retained within the chuck itself and which mechanism will be so arranged as to be set in motion by a switch member, such as an electric control switch conveniently located on a stationary part of the machine frame and readily accessible to the operator, wherein the source of power may be arranged to be automatically cut off from the jaw operating mechanism consequent upon a predetermined gripping pressure between the jaws and the work.

Other objects of this invention will become more apparent from the following description, which refers to a preferred embodiment of the invention illustrated in the accompanying drawings. The essential and novel characteristics of the invention will be set forth in the claims.

Figure 1:
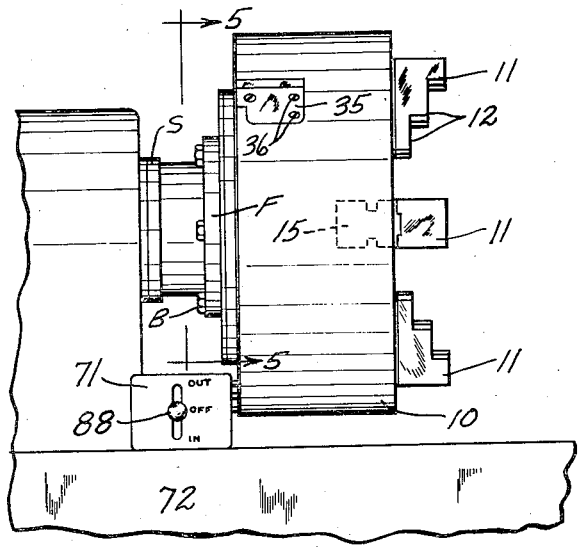
Figure 2:
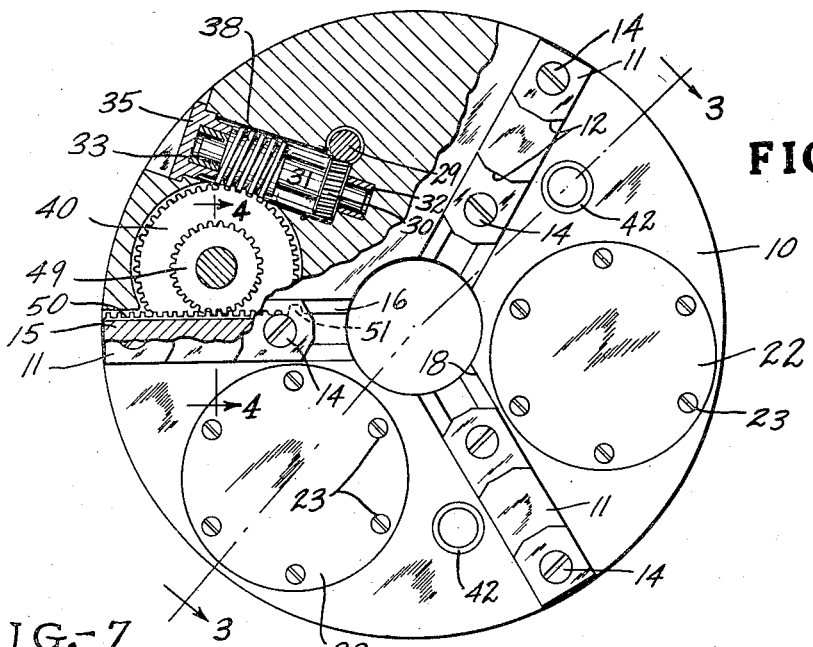
Figure 7:
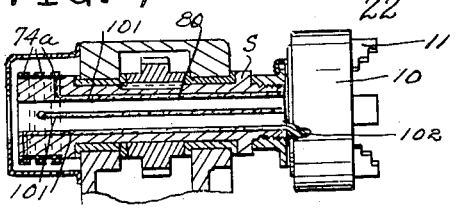

In the drawings, Fig. 1 is a side elevation of my improved chuck mounted on a machine tool, the latter being fragmentarily illustrated; Fig. 2 is a front elevation of the chuck, partially broken away to illustrate more clearly the internal construction; Fig. 3 is a radial section, indicated by the line 3—3 on Fig. 2; Fig. 4 is a fragmentary section, indicated by the line 4—4 on Fig. 2; Fig. 5 is a fragmentary transverse vertical section, taken along the line 5—5 on Fig. 1; Fig. 6 is a diagram illustrating the various gearing mechanisms, together with the motors, and electric controls therefor; Fig. 7 illustrates a modified form of chuck mounting.

Referring again to the drawings, and especially to Figs. 1 and 3, I have illustrated a frame or relatively stationary member of an engine lathe, having a spindle S, which is rotatably mounted therein and which is adapted to be rotated in the usual manner. Mounted on the end of the spindle, as by means of a suitable threaded connection, is a face plate F, to which my improved chuck is secured in the customary manner by the bolts B.

My improved chuck, as shown, has a cylindrical chuck body 10, on the outer face of which are slidably mounted a plurality of equiangularly radial jaw members 11, three being shown in the present embodiment. The jaw members 11 may have the usual stepped jaw formation, generally indicated at 12. They are shown as secured by means of suitable bolts 14 to jaw retaining members 15. Each of the retaining members 15 is grooved on opposite sides, as at 16, to fit tongues 17, formed in radially extending guideways or channels 18 in the outer face of the chuck body 10.

Each jaw 11 is operated by an independent motor 20, through suitable sets of gearing, hereinafter to be described. As shown in Figs. 2 and 3, the motors 20 are inset in recesses 21, in the chuck body 10, and are retained therein by caps 22, which are secured to the workholder by bolts 23, in such a manner that the caps are flush with the front face of the workholder. The armature shafts 25 of each motor are mounted in ball bearings 26 and 27 carried by the chuck-body and cap respectively. Each shaft extends rearwardly beyond the bearing 26 into a recess 28 in the chuck body, where it is provided with worm threads 29. The threads 29 of the motor shafts mesh with respective worm wheels 30 (Fig. 2) carried by transverse shafts 31 mounted in suitable bearings 32 and 33. The bearing 32 is supported in a cylindrical recess 34 in the body of the chuck, and the bearing 33 in a cap member 35 set into the periphery of the chuck body and secured to it by suitable bolts 36 (Fig. 1).

Rigidly mounted on each shaft 31 is a worm 38, arranged to mesh with respective worm gears 40. As shown in Fig. 3, each worm gear 40 is a part of respective composite gear members 41, each of which is journalled at one end in a bushing 42, carried in the body of the chuck, and at the other end on a stud 43, carried by a cap member 45, which is secured to the rearmost face of the chuck, as by suitable bolts 46, and projects into a central recess 47 of the composite gear member 41. A suitable bearing member, such as the ball-bearing ring 48, is interposed between the stud 43 and the inner periphery of the recess 47. The forward end of the composite gear member 41 is formed into a spur pinion 49, which are arranged to mesh with rack teeth 50 formed on the faces of the respective jaw mounting blocks 15.

It results from the construction described that as the motors are turned in one direction they serve, through the medium of two sets of worm gear transmission units, and the spur-gear reduction unit to translate the rotation of each motor into radial movement of the respective jaws. The worm gear units serve a dual purpose: First, they materially reduce the speed given by the rotation of the motor and thus, through the medium of the spur gear and rack assemblies, enable a relatively high rotating means to be translated into a comparatively slow radial movement of the jaws, with the corresponding increase in power. Second the worm gears serve as a lock to prevent the movement of the jaws through a pressure exerted thereon.

It is, of course, important that the jaws move equally, to accurately center the member clamped. I insure this, though the motors might tend to operate at slightly different speeds, by a single idle gear meshed with all of the armature shafts. As shown, I have provided each armature shaft, at its rearmost end, with a series of gear teeth 60, arranged to mesh with a common gear ring 62, which is rotatably mounted about a cylindrical boss-like portion 63 of the chuck body and held by a cap 64. Therefore, it is impossible for any motor to run ahead or lag behind the others. Moreover, whenever any motor is rotated it will cause a rotation of the others. Hence, if there should be a failure of any one or more motors, the other motors, through the gear ring 62, would rotate the non-driving motor and thus serve to close or open that jaw, as required.

While the motor and gearing mechanism is very compactly mounted in the chuck body, it is easy of assemblage therein. Thus, the jaws 15 may be first inserted by inward radial movement in their guideways, then the spur units 41 may be slid into place axially and the bearing caps 45 applied and secured to the rear face of the chuck body. Then the intermediate worm units may be mounted by screwing the worms 38 into the threads of the worm wheel 40 until the worm shaft 31 is positioned in its bearing; then the cap 35 for the outer end of this worm is secured. Then the motor shafts may be applied by screwing their worms into the worm wheels 30 of the intermediate units. When the armature on this shaft is in place with the inner bearing 26 supporting the chuck body, the cap 22 is located and secured by its screws. Each motor is now geared independently with its respective jaw. The jaws are then accurately given the same radial position, (for instance, by moving each of them inwardly against a slightly tapered templet occupying the central bore in the chuck body) and then the ring gear 62 is put in place and covered by its securing cap 64. This insures all of the jaws being in exactly the same radial position.

Electrical energy may be supplied to the motors from any of the well-known sources. As shown in the drawings, I have indicated the use of three-phase alternating current, which is found in many industrial establishments of the present day. This current may readily be transmitted through a transmission line 70, to a switch or control box 71, mounted upon a relatively stationary part of the machine, such as the frame member 72. The control box 71 preferably transmits the electrical energy to the chuck through the medium of a series of brushes 73, which are arranged to be resiliently pressed into contact with respective collector rings 74, preferably secured to the rear face of the chuck body.

In the drawings I have indicated the use of three small induction motors, each of which are connected by means of suitable wiring 80, to the collector rings 74, which are mounted on a suitable insulating member 85, on the inner face of the chuck body and with which the switch contact members 73 coact. It will be noted that I have shown a three-phase type motor and hence the release of the work may readily be accomplished by a reversing switch 88, Fig. 6, which reverses two of the phases as the direction of rotation of an induction type motor is reversed by reversing any two of the windings. The reversing switch is preferably contained within the control box 71.

To prevent damage to the work, I provide an automatic arrangement for shutting off the supply of current to the motor consequent upon the gripping of the work by the chuck jaws, which places the motor under a predetermined overload. As shown in the diagram of Fig. 6, an overload circuit breaker 90 is interposed in the main line and is arranged to be calibrated by a suitable adjusting screw 92, to vary the permissible load on the motors. The adjusting screw 92 coacts with a suitable spring 93, arranged to hold the armature of the circuit breaker solenoid down. The calibration is accomplished in the usual way, by increasing or decreasing the tension on the spring, thereby increasing the current required to cause the circuit breaker armature to trip the breaker.

The circuit breaker is also effective to stop the action of the motors when the jaws reach the limit of their outward movement. Any suitable abutment may be provided to effect such limit, as for instance, an extra high tooth or shoulder 51 at the inner end of the rack on the jaw. When the jaw is being withdrawn so that such shoulder engages the driving pinion 49, no further movement is possible, and hence an overload is thrown on the motor, causing the circuit breaker to operate to open the circuit.

It will be understood from the description given, and the illustration in the drawings, that my chuck has many valuable features combining to make it a very efficient piece of mechanism for the purpose intended. Among these features may be mentioned first the power of the chuck, resulting from the great reduction in the gearing to effectively grip the work; second, the compelled equal action of all the jaws to accurately center the work; third, the speed of operation resulting from the employment of motors; fourth, the self-locking characteristic causing the maintenance of the gripping action after the motors stop; fifth, the ability to accurately control the pressure to be applied by the jaws to the work; sixth, the compactness of the whole mechanism within a rotatable chuck body; and seventh, the comparatively low cost of manufacture, resulting from the simplicity of the parts employed, the ease of machining the body to receive them and the ready assemblage of the parts.

Fig. 7 illustrates my improved chuck mounted on an engine lathe with collector rings 74a positioned at the far end of the lathe spindle S. This form of mounting permits the use of a cutting fluid without danger to the electrical equipment of the chuck. The motors 20, as well as the gearing, are protected by gaskets 100, which prevent the seepage of the cutting material to the motors. The wires 80 are then led toward the axis of the chuck and along slots 101 cut in the internal surface of the spindles S to the far end thereof, which carries suitable collector rings 74a, to which the current is supplied in the same manner as heretofore described in connection with the collector rings 74. The wires 80 are covered with the usual resisting insulation and sealing material 102 is used to prevent the liquid from entering the chuck through the openings provided for the wires 80.

I claim:

1. In a chuck, a rotatable chuck body, a plurality of movable gripping jaws mounted on said body, independent sets of gearing carried by said body and operative on respective jaws, and an independent motor carried by the chuck body for each set of gearing.

2. In a chuck, a rotatable chuck body, a plurality of movable gripping jaws mounted on said body, independent sets of gearing carried by said body and operative on respective jaws, an independent motor operatively connected to respective sets of gearing, and means interconnecting said sets of gearing to cause a simultaneous action of such jaws.

3. In a chuck, a chuck body, a plurality of movable work-gripping jaws mounted in said chuck body, a corresponding number of sets of worm gearings to operate said jaws, a corresponding number of electric motors, each operatively connected to the respective worm gearing, and means to maintain the motors in step.

4. The combination of a chuck body, a plurality of gripping jaws carried thereby, a corresponding plurality of motors carried by the chuck body, gearing between each motor and the corresponding jaw, each motor having a pinion on its armature shaft, and a ring gear carried by the chuck body and meshing with the pinions of all the motors.

5. In combination with a machine tool, having a spindle rotatably mounted therein, a chuck carried by and axially aligned with said spindle, a plurality of gripping radially movable jaws mounted on said chuck and arranged to center an object relative to the spindle axis, independent motors carried by said chuck and mounted fixedly with respect to said chuck and operatively connected to move said jaws into and out of engagement with the object; means interconnecting said motors to insure their simultaneous action, a common source of power for said motors, means to stop said jaws simultaneous with a break in the source of said power, means connecting said power to said motors from a stationary element of the machine tool without interrupting the rotation of the chuck, and an overload circuit breaker interposed between the source of power and said motors.

6. In a chuck, a chuck body, a plurality of radially movable work-gripping jaws mounted in said chuck body, each of said jaws being provided with a tooth rack, pinions rotatably mounted in said body and arranged to engage respective racks, worm wheels rigidly secured to respective pinions, worms rotatably mounted in said body and arranged to drive respective worm wheels, electric motors mounted within the confines of said chuck body and each drivingly connected with the corresponding worm mentioned through the medium of a worm mounted on the armature shaft of each motor and a worm wheel meshing therewith and attached to the first-named worm, means to transmit electrical energy to said motors, and means to maintain the motors in step comprising a pinion mounted on each armature shaft and arranged to mesh with a common ring gear, whereby each set of gearing is caused to operate equally to enable the jaws to center the work relative to the chuck axis.

7. In a chuck, a chuck body, a plurality of equiangularly spaced radially movable work-gripping jaws mounted in said chuck body, each of said jaws being provided with a tooth rack, pinions rotatably mounted in said body and arranged to engage respective racks, a corresponding plurality of electric motors mounted within the confines of said chuck body and drivingly connected with the respective pinions through the medium of worm gearing, electric current collecting rings mounted on the chuck body and electrically connected to said motor, means to transmit electrical energy to said collector rings, means including an overload circuit breaker to cut off the electrical energy from said transmitting means, consequent upon the gripping of the work by said jaws with a predetermined pressure, and means including pinions mounted on the armature shafts and arranged to mesh with a common ring gear, whereby each set of gearing is caused to operate simultaneously to enable the jaws to center the work relative to the chuck axis.

8. In a workholding chuck, a plurality of radially movable work-gripping jaws, one electric motor for each of said work-gripping jaws, one of said motors and one of said jaws being connected for simultaneous movement as a unit operatively distinct from said other jaws and other motors.

9. In combination with a machine tool having a spindle rotatably mounted therein, a workholder carried by said spindle, work-gripping jaws movably mounted on said workholder, and a motor carried eccentrically of said spindle and within said workholder and stationary relative to the workholder and operatively connected to move said jaws into and out of engagement with the work, each of said motors being respectively connected to one of said jaws.

10. In a workholding chuck, a rotatable chuck body, a plurality of radially movable gripping jaws carried by said body, a corresponding number of motors eccentrically carried by said body and stationary relative thereto, and means including reduction gearing operatively connecting each of said motors to a respective jaw.

11. In a chuck, the combination of a chuck body, a plurality of jaws carried thereby, a corresponding plurality of motors mounted fixedly with respect to said chuck body and within said chuck for operating the jaws, means for keeping the motors in step with each other, and self-locking means to retain said parts in a predetermined position.

12. In combination with a machine tool having a spindle rotatably mounted therein, a workholder carried by said spindle, a plurality of radially movable work-gripping jaws mounted on said workholder, a plurality of electric motors carried by said workholder and each operatively connected to move a jaw into and out of engagement with the work and means to stop said jaws and lock them against rotation simultaneously with the cessation of flow of electrical energy through said motors.

CHARLES W. OLSON.